June 7, 1927.
E. L. BLICK
1,631,358
STAY CONNECTION FOR WEIGHING APPARATUS AND THE LIKE
Original Filed June 4, 1923
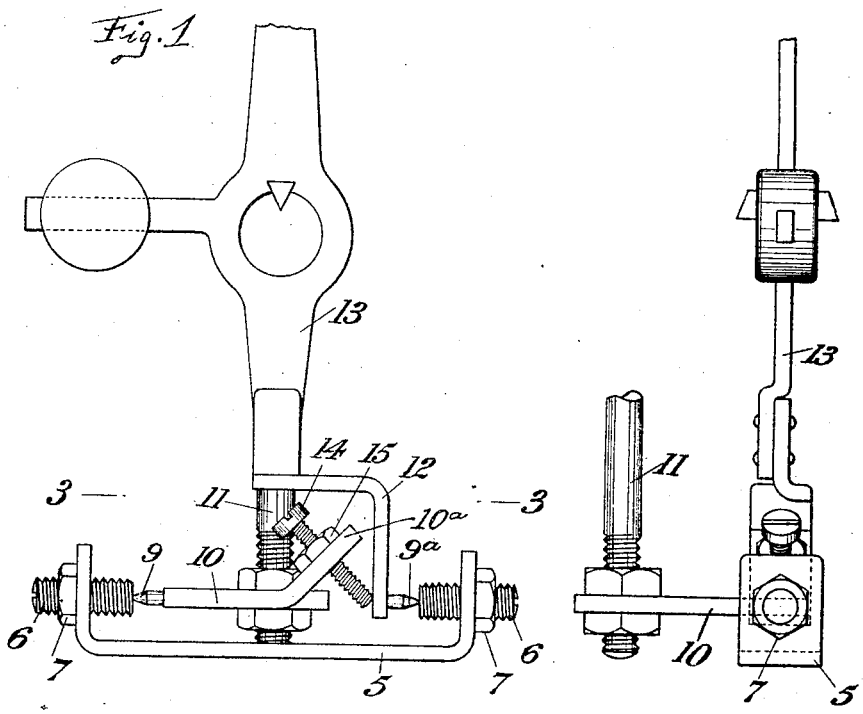
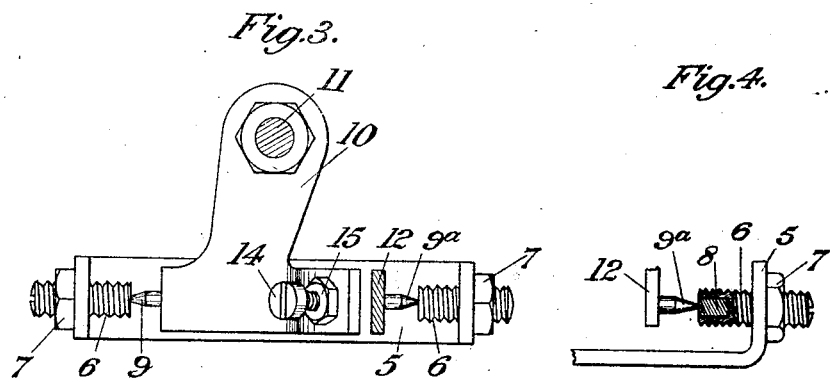
Inventor:—
Ernest L. Blick
by George E. Folkes.
his Attorney Patented June 7, 1927.

1,631,358

UNITED STATES PATENT OFFICE.

ERNEST LESLIE BLICK, OF ALTRINCHAM, ENGLAND, ASSIGNOR TO THE AUTOMATIC SCALE COMPANY, LIMITED, OF ALTRINCHAM, ENGLAND.

STAY CONNECTION FOR WEIGHING APPARATUS AND THE LIKE.

Original application filed June 4, 1923, Serial No. 643,445, and in Great Britain June 24, 1922. Divided and this application filed July 29, 1924. Serial No. 728,946.

This invention is a division of the application Ser. No. 643,445 filed June 4th 1923 and has reference to the stay connections employed in combination with weighing apparatus, and provides a form of stay construction which is very sensitive in operation the stay dispensing with the usual knife-edges and having a freely sensitive motion.

The invention comprises a tension stay particularly applicable for use in combination with weighing apparatus, the stay having two points or point contact bearings which are adapted to make contact with conical bearings or points connected to the scale levers or mechanism through which the motion of the said lever or mechanism is communicated to the stay and by the stay to another part of the scale mechanism. The invention further resides in the provision of a resilient mounting and adjustment for the contact bearings, and in the provision of a stop to maintain the stay against accidental displacement from its contact points or bearings.

The invention will now be described with particular reference to the accompanying sheet of drawings.

Fig. 1 is a front elevation of the stay and the attendant parts of the scale mechanism.

Fig. 2 is a side elevation of Figure 1.

Fig. 3 is a sectional plan the section being taken on line 3—3 of Figure 1, and

Fig. 4 is a detail view partly in elevation and partly in section of the right hand lower extremity of Figure 1.

The stay comprises a strip of metal 5 which is cranked upwardly at each end. In each of these upwardly cranked ends is adjustably mounted by means of a screw 6 and nut 7 a conical jewel bearing 8, the two bearings being in horizontal alignment one with the other.

Each of these bearings 8 is adapted to have contact with the cone points or needles 9, 9ᵃ the point 9 being mounted on the plate 10 secured to the screw threaded pendulous rod 11 forming part of the weighing system of the scale and the cone point 9ᵃ being connected to the plate 12 which is secured to the indicator arm 13 of the scale mechanism. The arrangement is such that any motion imparted from a lever in the scale mechanism through one of the conical points say from the pendulous rod 11 is communicated to the pointer 13 through the stay 5. The stay 5 can have a radial oscillatory motion about the said contact points 9, 9ᵃ and the bearings, that is, it can freely swing about the said points. In addition provision is made, say, by way of the adjustable screw 14 and the locknut 15 to prevent the stay bearings 8 and the cone points 9, 9ᵃ from accidental displacement due to any excessive or violent motion being imparted to the scale mechanism. It will be observed that this screw 14 is mounted in the cranked extension 10ᵃ of the plate 10 and that the end of the screw can have adjustment to or from the vertical section of the cranked plate 12 so as to prevent displacement of the cone points from their bearings.

Claims:—

1. A stay for use in connection with weighing scales comprising a plate adapted for connection to the resistant mechanism of the scale, a plate adapted for connection with the indicating mechanism, a bearing stay, a cone point bearing connection between said stay and the first mentioned plate and a cone point bearing connection between said stay and the second mentioned plate whereby a substantially frictionless connection is obtained between the resistant mechanism and the indicating mechanism.

2. A stay for use in connection with weighing scales, comprising a plate adapted for connection with the resistant mechanism of the scale, a conical point mounted on said plate, a plate adapted for connection with the indicating mechanism, a conical point on said second mentioned plate, a cranked stay, and bearings adjustably mounted in the cranked ends of said stay and constituting the bearings for aforesaid conical points.

3. A stay for use in connection with weighing scales, comprising a plate adapted for connection with the resistant mechanism of the scale, a conical point mounted on said plate, a plate adapted for connection with the indicating mechanism, a conical point on said second mentioned plate, a cranked stay, bearings adjustably mounted in the cranked ends of said stay and constituting the bearings for aforesaid conical points, and adjustable means for preventing the accidental displacement of the said points from their bearings.

In testimony whereof, I have signed my name to this specification.

ERNEST LESLIE BLICK.